Feb. 20, 1940.  K. R. LARSON  2,190,791
ILLUMINATED BAIT
Filed March 23, 1938
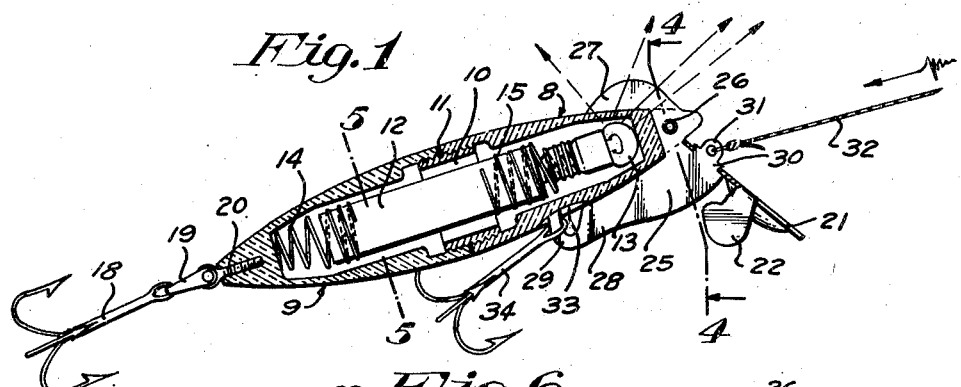
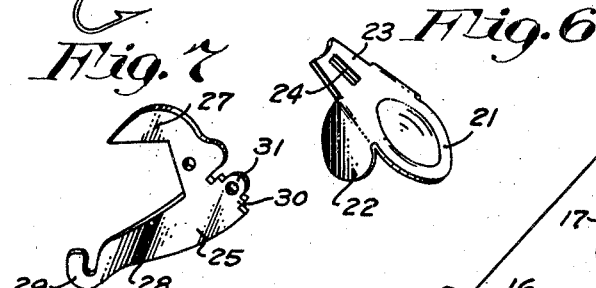
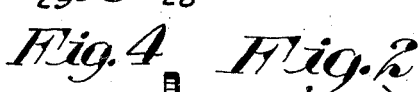
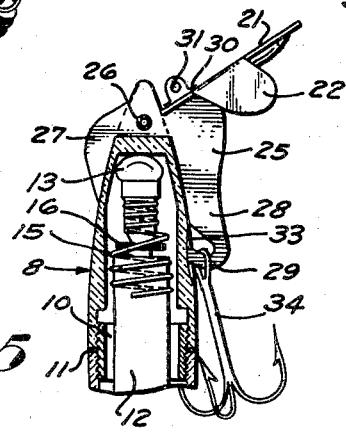
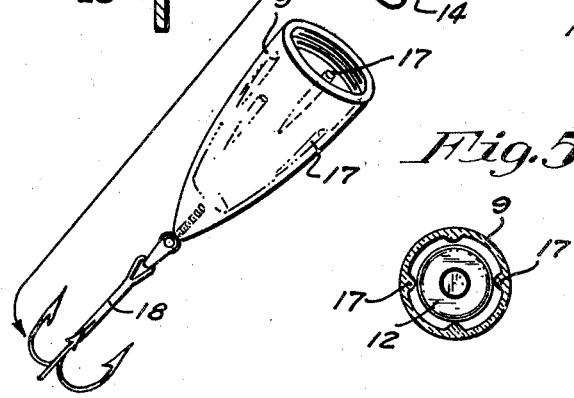
Inventor
Karl R. Larson
By his Attorneys
Merchant & Merchant Patented Feb. 20, 1940

2,190,791

UNITED STATES PATENT OFFICE 2,190,791

ILLUMINATED BAIT

Karl R. Larson, Minneapolis, Minn.

Application March 23, 1938, Serial No. 197,660

6 Claims. (Cl. 43—44)

My present invention relates to artificial fish baits and provides a highly efficient device of this character.

Generally stated, the invention consists of the novel devices, combinations of devices, and arrangement of parts hereinafter described and defined in the claims.

This improved fish bait is of the general character designated as a "wobbler," but involves other important features including means for illuminating at least a portion of the bait body, and also an improved and highly efficient front end structure including what I designate as a "spoon" and "keel or attaching plate." The last two noted elements afford a highly efficient and low cost connection between the fish line and the fish body and, moreover, they function in producing the desired wobble movement in close imitation of the movements of a minnow or small fish. Wobbling fish baits are usually subject to the objection that the wobbling movement given to the bait is very extreme and far greater than that of a minnow or small fish, and hence, not a good imitation of the normal movements of such fish. The operation of the devices which will produce the desired natural imitation of the movements of a minnow or small fish will be further considered after having first described a preferred or commercial form of the bait illustrated in the accompanying drawing, wherein like characters indicate like parts throughout the several views.

Referring to the drawing:

Fig. 1 is an axial section of the improved bait with some parts shown in full;

Fig. 2 is a perspective showing the elements of the bait disconnected and drawn axially apart;

Fig. 3 is an axial section of the front end portion of the bait, with some parts shown in full and with a circuit breaking washer or disc interposed between the battery and light bulb;

Fig. 4 is an enlarged section taken on the line 4—4 of Fig. 1;

Fig. 5 is a transverse section taken on the line 5—5 of Fig. 1, the battery being shown in full;

Fig. 6 is a perspective of the so-called "spoon"; and

Fig. 7 is a perspective of the so-called "keel or attaching plate."

The body of the bait is made up of two hollow tapered and approximately conical sections 8 and 9 that may be made of various materials but are preferably made of materials generally known as a phenol condensation product, such as Bakelite or Celluloid, for example. These sections 8 and 9, as shown, are detachably connected by an externally threaded coupling bushing or sleeve 10 having threaded engagement with the interiors of said sections. One of the sections, to wit: preferably the rear section 9, has detachable engagement with the bushing 10 but the bushing is preferably permanently secured to the upper section 8, either by a tight engagement or by application of cement or the like.

A sealing gasket 11 of leather, rubber or the like, is interposed between the adjoining edges of the sections 8 and 9, thereby preventing water from getting into the interior of the bait. Preferably, the main body sections 8 and 9 are opaque but the section 8 will have a front zone 8a that will pass light rays to a greater or less extent and is herein designated as a translucent zone. This translucent zone 8 may be tinted red or any other color or may be clear. In practice I have found that the best results are obtained not by a completely illuminated body, but by a body having an illuminated front end portion or zone.

Mounted within the bait body is a small dry battery 12 and small light bulb 13. A coiled spring 14, applied to the rear end of battery 12, reacts against the rear portion of the section 9 with a force tending to press the battery forward.

A coiled spring 15 is shown as wrapped around the metallic casing of the battery 12, at its front end, and is provided with a reduced spiral portion that embraces the outer metallic portion of the socket of light bulb 13. This spring 15 tends to hold axial contacts of the battery and bulb 13 axially separated; but the spring 14 is of such strength that under normal conditions, it will compress the spring 15 so as to force the bulb against the front end of the section 8 and the axial contact of battery 12 into engagement with the axial contact of bulb 13, thereby closing the battery circuit through the light bulb. In respect to the relation of these springs 14 and 15, this feature will be further discussed in the description of the operation or action of the device.

The numeral 16 indicates a small washer or disc of insulating material which will be placed between the axial contacts of the battery and light bulb when the bait is out of use or at anytime when illumination of the bait is not desired. To hold the battery centered, the sections 8 and 9 are shown as provided with circumferentially spaced longitudinal internal ribs 17.

A multi-pronged fish hook 18 is applied to the rear end of the body section 9, as shown, by means of a small coupling yoke 19 and threaded eye-bolt 20, the stem of which latter is rigidly anchored in the body 9.

Important novelty is involved in the construction and application of the so-called "spoon and keel plate" above briefly noted. The spoon 21 is dished and formed with laterally spaced depending stabilizing wings 22 and with an anchoring end 23, which latter has a slot 24.

The keel or attaching plate 25 is cut out or formed to embrace and fit the front end portion of the body section 8; and the front end of said body 8 is vertically slit so that that front portion of said plate 25 is inserted into the said slit and there anchored by a rivet 26 passed through the slit front end of the said body 8 and through the said plate 25. This rivet 26 is preferably a small tubular rivet, the outer ends of which are upset, as best shown in Fig. 4. The plate 25 thus formed is provided with three important parts, to wit: a flat upper arm 27, a lower arm 28 that terminates in a hook lug 29, and a lug 30 that terminates in a perforated lug 31. The lug 30 is inserted through the slot 24 of the spoon and is upset or expanded just above the front surface of the spoon 21 preferably before the assembled spoon and plate 25 are applied to the bait body.

When the spoon and plate are thus assembled, the perforated lug 31 will project beyond the front of the spoon for the attachment thereto of the fish line 32. The hook lug 29 is engaged in the small groove 33 formed in the body of the bait 8, thereby holding the arm 28 against lateral shifting movements in respect to the bait body. This hook lug 29 is used to attach a multi-pronged fish hook 34 to the underside or bottom of the bait body.

From the foregoing statement it is evident that the various parts of the bait may be very quickly and easily assembled. The metallic parts, including the spoon and the keel plate, may be cheaply made from stamped metal. When the parts are assembled the battery will be yieldingly mounted between the springs 14 and 15 and the bulb 13 will be pressed against the front end of the section 8. Of course, when the bait is to be used as an illuminated bait, the insulating washer 16 will be removed so that under normal tensions of the springs, the bulb will be in circuit with the battery and the bait will be illuminated when drawn through the water by the line 32. The desirable movement given to the bait has already been described. The weight of the hooks and of the spoon and keel plate tend to keep the bait right side up while producing its wiggling or wobbling movement.

When the bait is thrown by the line the rear end of the bait body and the hook 18 will be thrown ahead and the movement then given to the battery will cause compression of the spring 14, thereby breaking the battery circuit and putting the bulb out of action while the bait is being thrown through the water. When the bait lights on the water and is subject to pull from the line 32, spring 14 will compress spring 15 and close the battery circuit, thereby illuminating the bait providing, of course, that the washer 16 has been removed. When it is desired to use the bait without illumination, the washer 16 will be left in position between the contacts of the battery and light bulb.

From the foregoing, it will be understood that the commercial form of the bait is capable of modifications within the scope of the invention herein disclosed and claimed.

What I claim is:

1. An artificial fish bait comprising a body member, a vertically disposed keel plate formed to embrace the upper and lower portions of one end of said body and be secured thereto, and a spoon anchored to the depending portion of said keel plate and obliquely depending therefrom.

2. An artificial fish bait comprising a body member, a keel plate formed to embrace the upper and lower portions of one end of said body and be secured thereto, and a spoon connected to the depending portion of said keel plate and obliquely depending therefrom, said spoon having laterally spaced depending stabilizing wings.

3. An artificial fish bait comprising a body member, a keel plate formed to embrace the upper and lower portions of one end of said body and be secured thereto, and a spoon connected to the depending portion of said keel plate and obliquely depending therefrom, the lower portion of said keel plate terminating in a hook attaching lug, and a fish hook attached to said body by said lug.

4. The structure defined in claim 3 in which said lug engages a groove in the bottom of said body.

5. The structure defined in claim 1 in which said keel plate is provided with a line-attaching lug that projects through a slot in said spoon and is in part upset to make secure the attachment between said spoon and keel plate.

6. The structure defined in claim 1 in which the said end of said body is provided with a slot that receives an intermediate portion of said keel plate, and a rivet passed through the slotted end of said body and through the inserted portion of said keel plate.

KARL R. LARSON.